April 18, 1961
W. B. TAYLOR ET AL
2,980,451
THREADED PIPE JOINT HAVING AN EXTRUDABLE
GENERALLY NON-RESILIENT SEALING MEANS
Filed April 17, 1957
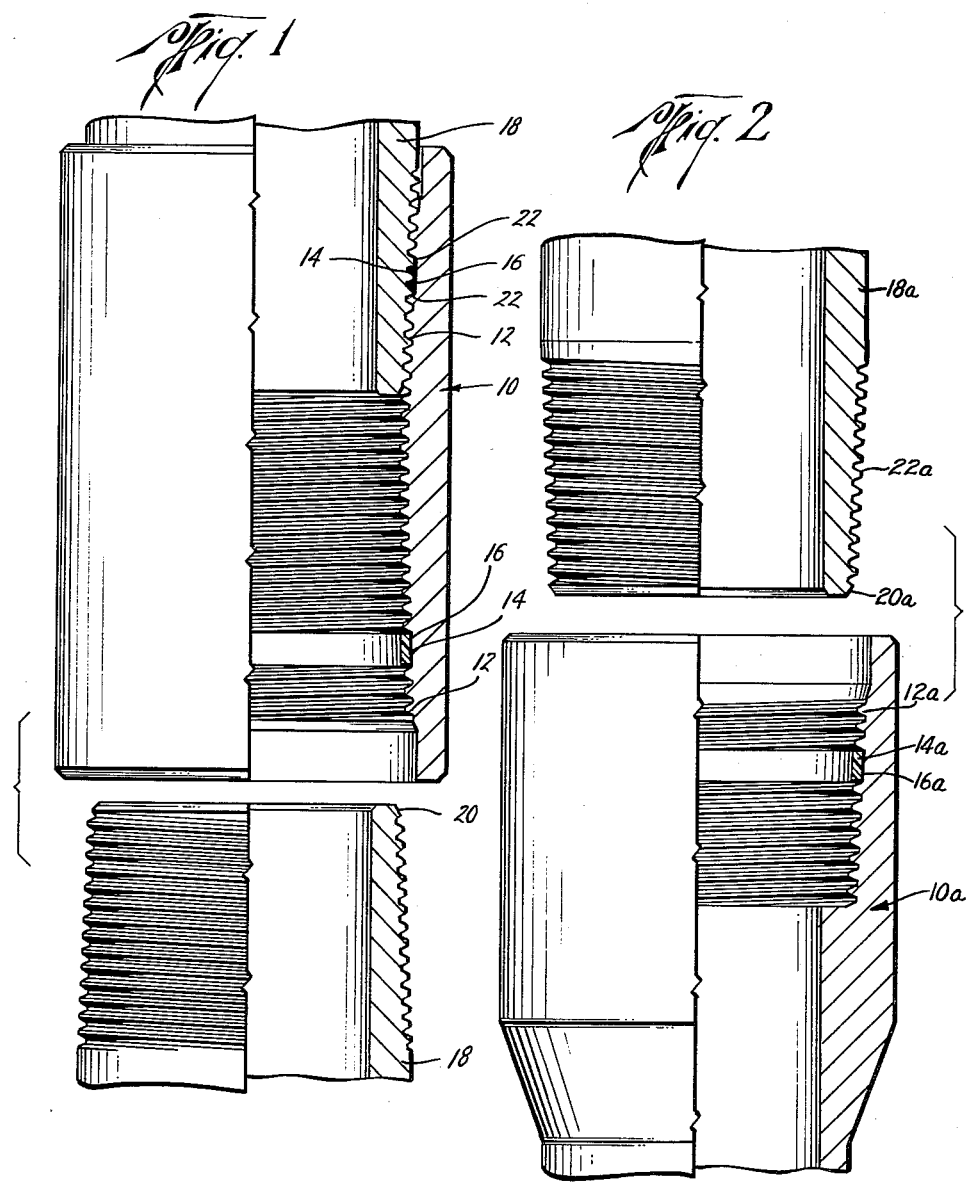
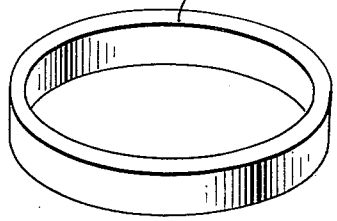
William B. Taylor
Wilber H. Griffin
INVENTORS
BY *James F. Weiler &*
*Jefferson D. Giller*
ATTORNEYS

United States Patent Office 2,980,451
Patented Apr. 18, 1961

2,980,451

THREADED PIPE JOINT HAVING AN EXTRUDABLE GENERALLY NON-RESILIENT SEALING MEANS

William B. Taylor and Wilber H. Griffin, Houston, Tex., assignors to Atlas Pipe Inc., a corporation of Texas Filed Apr. 17, 1957, Ser. No. 653,451

4 Claims. (Cl. 285—332.3)

This invention relates to sealed pipe joints and couplings.

Others in the art have proposed couplings and joints which have a packed off area or portion disposed in a threaded portion of the joint. For example, U.S. Patent No. 126,553, granted May 7, 1872 on the application of D. C. Kellam illustrates an early attempt at providing such a pipe coupling or joint to obtain a seal. A much later patent of the same general type is U.S. Patent No. 2,246,436, granted June 17, 1941 on the application of G. T. Downey. These and other sealed joints and couplings of this general type, or what has been termed the mutilated thread type, have not been entirely satisfactory due to the fact that the packing is not confined in such a manner that relatively high pressures are effectively sealed at the joint. For example, these and other constructions of this general type would not be satisfactory for use in oil wells where enormous pressures are encountered or in other uses in which pressures of a relatively high order must effectively and reliably be sealed by the coupling or pipe joint.

The present invention is based upon the discovery that by properly confining the packing or sealing, an effective and reliable seal is provided in joints and couplings of this type which withstand pressures of relatively high orders.

Accordingly, it is an object of this invention to provide an improved joint or coupling of the mutilated thread type which effectively and reliably seals against pressures of relatively high orders.

Yet a further object of the present invention is the provision of such a joint or coupling which is economically and easily manufactured, repaired and maintained.

Yet a further object of the present invention is the provision of such a joint or coupling in which guide means are provided on the end of the male member of the joint so that the packing ring or seal is securely maintained in place as the joint or coupling is being made up.

Yet a further object of this invention is the provision of a sealed joint or coupling in which thread dopes of maximum lubrication effectiveness instead of maximum roughage content may be used and yet provides a reliable efficient sealed joint for relatively high pressures.

Other and further objects, features and advantages will be apparent from the following description of presently preferred examples of the invention, given for the purpose of disclosure, and taken in conjunction with the accompanying drawing, in which Figure 1 illustrates a coupling, in quarter section, according to the invention, Figure 2 illustrates a joint, in quarter section, according to the invention, and Figure 3 is a perspective view illustrating a satisfactory seal ring for use in the coupling and joint of the invention.

Referring now to Figure 1, a coupling member 10 is illustrated which has the inwardly tapered threaded surfaces 12 disposed at each end. For the purposes of the present invention, it is essential that the inner threaded surfaces 12 of the coupling member be tapered to adequately confine the packing or seal rings 14 which are placed in the grooves 16 cut in the tapered threaded surfaces 12 intermediate the pipe ends 18 of the pipe to be received or threaded into the coupling member 10.

The grooves 16 preferably are cut a few thousandths of an inch below the valleys of the threads and are essentially flat surfaces as illustrated. The packing 14 is of ring-shape configuration and should be of a thickness so that its inner surface extends only slightly beyond the peaks of the threads so that as the beveled or guide surfaces 20 on the pipe ends 18 pass over the packing rings 14 as the coupling is made up, the packing rings 14 will be urged into their packing chambers or grooves 16 rather than pushed out of them.

While the grooves or packing chambers may be placed at some other part of the tapered threaded surfaces or sections 12, it is preferable to place them at points intermediate the ends of the pipe ends 18 so that coupling is balanced on both sides and not weakened, that is, balanced both from a pressure standpoint and a tensile standpoint.

When the coupling is made up, the pipe ends 18 of the pipe are inserted into the coupling member 10 and they compress and extrude the packing rings 14 so that there is a lip 22 disposed in the threaded area on each side of the grooves 16. It is believed that confining the packing rings 14 on the taper and in this manner results in the remarkable sealing qualities of the coupling. Thus, for example, in connecting tubing used in oil wells for this purpose, 2⅜ inch and 2⅞ inch sizes of tubing withstand tests up to and including 13,000 pounds per square inch. In making these tests, lubricating oil was used in lieu of pipe dope which indicates an important step forward toward the objective of using thread dopes of maximum lubrication effectiveness rather than maximum roughage content for void closures as is presently necessary in currently accepted standard tube joint make-up practices.

The joints of the Kellam and Downey patents, previously referred to, as well as other similar joints and couplings, do not effectively withstand pressures of this high order. As mentioned previously, it is believed that because of the non-taper formation of these joints and couplings, the packing is not confined sufficiently to prevent leakage. By placing the packing in a tapered threaded area, however, remarkably unexpected results in effectiveness of preventing leakage of high pressures are obtained due to the confining action and the extrusion of the packing as previously described.

Figure 2, to which reference is now made, illustrates a pipe joint connected, which is in all things identical to that of Figure 1 except that the box section 10a is formed on one end of the pipe to be connected. In Figure 2, the same reference numerals are used as those of Figure 1, except that the reference letter "a" has been added for convenience of reference. Thus, the packing 14a is provided in the groove or packing chamber 16a provided in the tapered threaded surface or section 12a and the box 10a. The remaining structure, function and advantageous results are the same as described in connection with Figure 1 and no further description of the joint of Figure 2 is deemed necessary.

The packing band or ring 14 may be formed of any preferred material which will extrude under presure as the connection is made up. One such material which is especially satisfactory is polymerized tetrafluoroethylene. This composition of matter is described in United States Patent No. 2,230,654, issued February 4, 1941 on the application of Roy J. Plunkett. The formation or fabrication of gaskets and packing bands of polytetrafluoroethylene is further described in United States Patent No. 2,456,262, issued December 14, 1948 on the application of Reuben T. Fields. The manufacture of this material is further described in Ind. and Eng. Chemistry, volume 39, page 870, September 1946, and is sold by E. I. du Pont de Nemours and Co. under the trademark "Teflon." This material is characterized by its chemical inertness which is characteristic from extremely low temperatures up to about 572° F. Through this wide temperature range it resists the attack of corrosive reagents and dissolution by solvents.

Molded polymerized polytetrafluoroethylene is a tough waxy solid, white to gray in color and is highly resistant to abrasion. This material is not resilient and readily extrudes in the manner previously described.

As mentioned previously, however, packing rings or bands formed of materials other than polymerized polytetrafluoroethylene may be used although this material is highly advantageous for use in the present invention. The other materials used, however, should be able to resist the pressures, heat and corrosive action of the fluids encountered in the well bore and should be extrudable under the conditions of use. By extrudable in the specification and claims is meant any material which will form pressure type lip seals under the conditions of use. Preferably, the material should be of such character that it will remain in extruded condition so that the packing ring may be run over time and again, as desired, without damage to the seal.

Joints and couplings constructed according to the present invention are highly advantageous in that they effectively provide a reliable and efficient seal for pressures of relatively high orders. Joints and couplings of this same general type heretofore proposed by others do not effectively seal pressures of these orders. Thus, a coupling or joint constructed according to the present invention attains the objects and has the advantages and features mentioned as well as others inherent therein and may advantageously be adapted for a wide variety of uses and conditions.

Various changes in details of construction and rearrangement of parts may be made within the spirit of the invention and the scope of the appended claims.

What is claimed is:

1. A sealed joint comprising an outer tubular member provided with an inwardly tapered threaded section on its inner periphery, an inner tubular member provided with an inwardly tapered threaded section on its outer periphery threadedly received in the outer tubular member, one of said members being provided intermediate the ends of its threaded section with an annular groove, and a ring-shaped extrudable generally non-resilient sealing member seated in said groove and extruded into and confined by the tapered threaded sections adjacent the annular groove.

2. A sealed joint comprising an outer tubular member provided with an inwardly tapered threaded section in its inner periphery, an inner tubular member provided with an inwardly tapered threaded section on its outer periphery threadedly received in the outer tubular member, one of said members being provided intermediate the ends of its threaded section with an annular groove, a ring-shaped extrudable generally non-resilient sealing member seated in said groove and extruded into and confined by the tapered threaded sections adjacent the groove, and a beveled guide surface on the terminal end of the other of said members for engaging and urging the sealing member into said groove upon making up the joint.

3. A sealed joint comprising an inner tubular member provided with an inwardly tapered threaded area on its outer periphery adjacent the terminal portion thereof, an outer tubular member provided with an inwardly tapered threaded area on its inner periphery threadedly receiving said inner tubular member in telescopic relation, said outer tubular member provided with an annular groove intermediate the ends of its threaded area, and a ring-shaped extrudable generally nonresilient sealing member seated in the groove and extruded into and confined by the tapered threaded areas adjacent the groove.

4. A sealed joint comprising an inner tubular member provided with an inwardly tapered threaded area on its outer periphery adjacent a terminal portion thereof, an outer tubular member provided with an inwardly tapered threaded area on its inner periphery threadedly receiving said inner tubular member in telescopic relation, said outer tubular member provided with an annular groove intermediate the ends thereof, a ring-shaped extrudable generally nonresilient sealing member seated in the groove and extruded into and confined by the tapered threaded areas adjacent the groove, and a beveled guide portion on the outer terminal end of the inner member for engaging and urging the packing ring into the annular groove upon telescoping said inner and outer tubular members.

References Cited in the file of this patent

UNITED STATES PATENTS

| | | |
|---|---|---|
| 126,553 | Kellam | May 7, 1872 |
| 2,087,185 | Dillon | July 13, 1937 |
| 2,110,127 | Hinderliter | Mar. 8, 1938 |
| 2,131,839 | Hall | Oct. 4, 1938 |
| 2,246,436 | Downey | June 17, 1941 |
| 2,380,690 | Graham | July 31, 1945 |
| 2,508,306 | Thurston | May 16, 1950 |
| 2,553,340 | Smith | May 15, 1951 |
| 2,631,871 | Stone | Mar. 17, 1953 |

FOREIGN PATENTS

| | | |
|---|---|---|
| 576,777 | Great Britain | Apr. 18, 1946 |

OTHER REFERENCES

Drilling and Production Practice, 1949, copyright 1950, by the American Petroleum Institute.